United States Patent

Tsukamoto et al.

Patent Number: 5,558,600
Date of Patent: Sep. 24, 1996

[54] HEAVY/LIGHT TRAFFIC BASED ON VEHICLE SPEEDS AND THROTTLE POSITIONS

[75] Inventors: Kazumasa Tsukamoto, Toyota; Masahiro Hayabuchi; Masaaki Nishida, both of Anjo; Yoshihisa Yamamoto; Hiroshi Tsutsui, both of Nishio; Kaoru Nadayoshi, Anjo, all of Japan

[73] Assignee: Aisin AW Co., Ltd., Japan

[21] Appl. No.: 427,875

[22] Filed: Apr. 26, 1995

[30] Foreign Application Priority Data

Apr. 28, 1994 [JP] Japan .................................. 6-111679

[51] Int. Cl.$^6$ .................................................. F16H 59/00
[52] U.S. Cl. ................................. 477/121; 364/424.01
[58] Field of Search ............... 477/97, 121; 364/424.01, 364/424.1, 424.02

[56] References Cited

U.S. PATENT DOCUMENTS

| 5,065,328 | 11/1991 | Abo et al. | 364/424.01 X |
| 5,089,963 | 2/1992 | Takahashi | 47/121 X |
| 5,099,428 | 3/1992 | Takahashi | 477/121 X |
| 5,285,523 | 2/1994 | Takahashi | 364/424.01 X |
| 5,410,477 | 4/1995 | Ishii et al. | 364/424.01 |

FOREIGN PATENT DOCUMENTS 450549  2/1992  Japan .

*Primary Examiner*—Khoi Q. Ta
*Attorney, Agent, or Firm*—Lorusso & Loud

[57] ABSTRACT

An transmission control unit includes a sensor for detecting a vehicle condition, a traffic condition monitor for determining whether or not traffic is heavy, a transmission pattern selector, and a transmission controller. The traffic condition monitor adds or subtracts a predetermined value in response to vehicle speed detected at set intervals of time so as to provide a vehicle speed value. The heavier the traffic, the larger the additional value. Also, the lighter the traffic, the larger the subtractive value. The vehicle traffic value is used in order to determine how heavy the traffic is.

10 Claims, 6 Drawing Sheets

FIG. 5(a)  Normal Traffic Transmission Pattern

Heavy Traffic Transmission Pattern 5,558,600

HEAVY/LIGHT TRAFFIC BASED ON VEHICLE SPEEDS AND THROTTLE POSITIONS

BACKGROUND OF THE INVENTION

1. Field of the Invention

The present invention relates to a transmission control unit for a vehicular automatic transmission. More particularly, the invention is directed to a transmission control unit designed to effect shifts suitable for heavy traffic.

2. Description of the Related Art

In order to prevent frequent shifting between low speed gears in an automatic transmission, in response to a slight change in speed when a vehicle runs through heavy traffic, and the uncomfortable ride resulting from same, attempts have been made to effect shifts suitable for heavy traffic (see Japanese laid-open patent publication No. 4-50549). Specifically, when vehicle speed and throttle position continue to be less than a predetermined value for a given period of time, the traffic is considered to be heavy. Within the transmission control unit, a predetermined normal traffic transmission map is changed to a heavy traffic transmission map. At a given throttle position a second gear is maintained longer when operating under control of the heavy traffic transmission map than when operating with the normal traffic transmission map.

The prior art attempts are effective when the traffic is truly or continuously heavy, but may not function efficiently when vehicle speed temporarily increases while the traffic is heavy. If the vehicle speed increases a given amount, a timer within the transmission control unit is reset, the traffic is then considered no longer to be heavy and, as a result, shifts are made in accordance with the normal traffic transmission map.

In order to eliminate the above-described problem, traffic conditions could be determined by calculating average vehicle speed for a fixed period of time rather than by simply measuring vehicle speed at each interval of time. However, stand-by time is required to make such a calculation, resulting in a delayed determination. To minimize such delay, measurement time could be shortened but the result would be an accuracy no better than that obtained when the vehicle speed is simply measured at regular intervals. Thus, this latter approach is not effective to solve the above-described problem.

SUMMARY OF THE INVENTION

Accordingly, it is a general object of the present invention to overcome the foregoing problems by the use of a predetermined additional/subtractive value ("predetermined control value") rather than average vehicle speed, as a control parameter. Heavier traffic gives a higher additional correction value, and smoother traffic gives a higher subtractive correction value for the control parameter used in the present invention.

Another object of the present invention is to provide a transmission control unit for an automatic transmission, which can accurately determine, without delay, whether or not traffic is heavy.

It is another object of the present invention to use throttle position as a parameter in order to more accurately determine whether or not the traffic is heavy.

It is a further object of the present invention to compare a variable value indicative of heavy traffic with another variable value indicative of non-heavy traffic so as to eliminate errors which may occur when determination is made based only on one of the two values and to thereby insure accurate determination.

It is a specific object of the present invention to avoid any delay in determining whether or not the traffic is heavy, which might otherwise occur due to reliance on too much data.

In order to achieve these objects, there is provided a transmission control system for an automatic transmission, which includes sensors for detecting parameters representative of vehicle conditions including at least vehicle speed. The control system also has traffic condition determinative means for determining whether or not traffic is heavy, based on the parameters as detected by the sensor means, transmission pattern selective means for selectively using either a normal traffic transmission map or a heavy traffic transmission map in response to the determination of the traffic condition determinative means. Further, the control system includes transmission control means for changing gear ratios according to the heavy traffic transmission map when selected and for changing gear ratios according to the normal traffic transmission map when selected. The traffic condition determinative means includes speed zone classification means for defining a plurality of vehicle speed zones, the zones each extending over a predetermined speed differential (range) and including a plurality of low speed zones, a plurality of high speed zones and a boundary dividing the high speed zones from the low speed zones. The predetermined values for the various speed zones are such that the differences between predetermined values for adjacent speed zones increase with increasing proximity to the boundary. In the preferred embodiment described below, the boundary is an intermediate speed zone spanning a range of speeds equal to said predetermined speed differential.

The vehicle speed detected by the sensor means is indexed under (matched against) one of the vehicle speed zones, and a predetermined value for the matching speed zone is added or subtracted so as to provide a vehicle speed value, the predetermined value being positive in the low speed zone where the traffic is heavy and negative in the high speed zone where the traffic is normal.

The traffic condition determinative means includes heavy traffic determinative means for determining whether the traffic is heavy, based on the vehicle speed value obtained by the speed zone classification means. A detected throttle position may be used as a parameter representative of vehicle speed by the heavy traffic determinative means. The heavy traffic determinative means is adapted to increase a heavy traffic value indicative of heavy traffic when the vehicle speed value is greater than a first predetermined value, and the throttle position detected by the sensor means is lower than a predetermined value, and to decrease the heavy traffic value when the vehicle speed value is greater than a first predetermined value, and the throttle position is higher than the predetermined value. The heavy traffic value obtained by the heavy traffic determinative means is taken as indicative of whether or not the traffic is heavy.

The traffic condition determinative means further includes a non-heavy traffic determinative means. The non-heavy traffic determinative means operates to increase a non-heavy traffic value when the vehicle speed value is less than a second predetermined value, the second predetermined value being less than the first predetermined value, and to decrease the non-heavy traffic value when the vehicle speed value is greater than a third predetermined value, the third predetermined value being greater than the second predetermined value. The non-heavy traffic value indicates traffic sufficiently light that the vehicle runs at a relatively high speed. The traffic may be considered to be heavy when the heavy traffic value is greater than the non-heavy traffic value.

The heavy traffic determinative means does not change the heavy traffic value when the vehicle speed value is less than the first predetermined value. Further, the non-heavy traffic determinative means does not change the non-heavy traffic value when the vehicle speed value is greater than the second predetermined value and less than the third predetermined value.

According to the present invention, the predetermined value is a positive value when a vehicle speed is within the low speed zone, and is a subtractive value when a vehicle speed is within the high speed zone. The difference between actual vehicle speeds and vehicle speed values in the intermediate speed zone is significantly greater than the difference between actual vehicle speeds and vehicle speed values in the low and high speed zones. This avoids the detrimental effect which might otherwise occur when the vehicle speed is only temporarily outside of the heavy traffic range. If the vehicle speed is slightly increased or decreased, the positive or negative value is subject to substantial change. The resulting vehicle speed value is rapidly changed to allow for more rapid determination of traffic conditions, as compared to the case in which average vehicle speed is utilized.

The heavy traffic value varies depending on vehicle speed value and throttle position. Because the throttle position reflects the driver's choice of operation which may be somewhat arbitrary, a combination of the heavy traffic value and the vehicle speed value allows for more appropriate determination of traffic conditions.

Moreover, a non-heavy traffic value is obtainable by the non-traffic determinative means and indicates that the vehicle is running at a high speed. This non-heavy traffic value is compared with the heavy traffic value. This comparison allows for more accurate determination of traffic conditions since the determination is not made based only on one of the two values. If, for example, traffic is not heavy, but a vehicle stops for a long period of time at a traffic signal, the heavy traffic value becomes large. At this time, the non-heavy traffic value is also relatively large. This avoids selection of the heavy traffic transmission map. If, on the other hand, the traffic is truly heavy, the non-heavy traffic value is small which enables selection of the heavy traffic transmission map.

The heavy traffic determinative means and the non-heavy traffic determinative means may make an inaccurate determination of traffic conditions when a vehicle speed value used in the heavy traffic determinative means is less than the first predetermined value and a vehicle speed value used in the non-heavy traffic determinative means is between the second and third predetermined values. However, no change is made to either value under such circumstances to insure accurate determination.

BRIEF DESCRIPTION OF THE DRAWINGS

FIG. 5(a) is a graph of throttle position versus vehicle speed representing a heavy traffic pattern and FIG. 5(b) is a graph of throttle position versus vehicle speed representing an ordinary traffic pattern.

DESCRIPTION OF THE PREFERRED EMBODIMENTS

Figure 1:
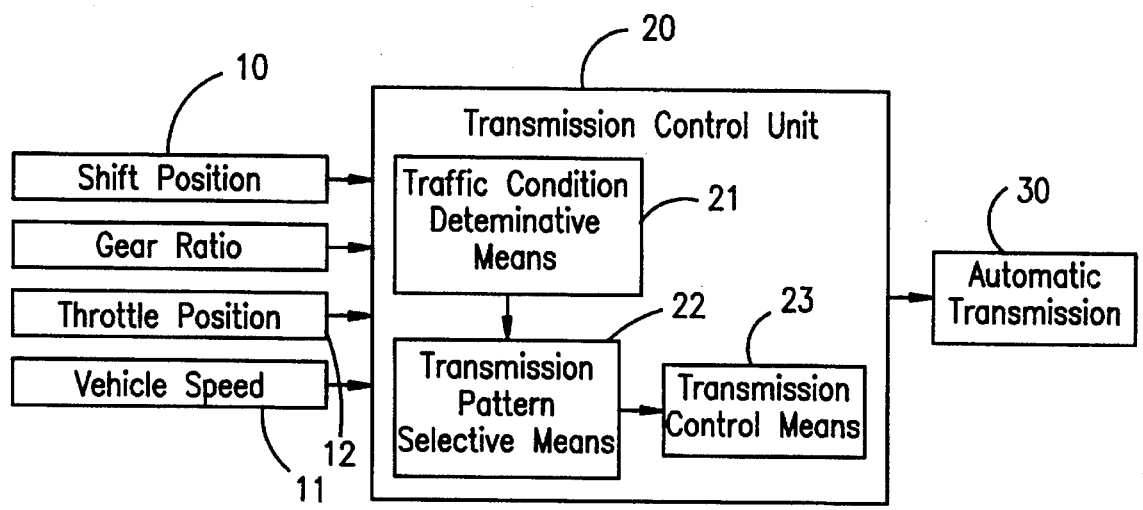
FIG. 1 is a block diagram of a control unit for an automatic transmission, according to one embodiment of the present invention.

The present invention will now be described by way of example with reference to the drawings. FIG. 1 is a block diagram of an automatic transmission control system including a control unit 20. This control unit 20 receives signals from sensor means 10 including various sensors for detecting parameters indicative of vehicle conditions, for example, shift position, gear ratio, throttle position, and vehicle speed. The detected vehicle speed is used as input in the program (FIG. 4) of a microprocessor incorporated into the control unit 20. A traffic condition determinative means 21 determines whether or not traffic is heavy based on the parameters obtained as input signals from the various sensor means. Transmission pattern selective means 22 selects either a predetermined transmission map suitable for normal traffic or a predetermined transmission map suitable for heavy traffic, in response to traffic condition determined by the traffic condition determinative means 21. Transmission control means 23 changes the gear ratio of the transmission in accordance with the selected transmission map. These means are operatively associated to generate electric signals for control of solenoid valves in an automatic transmission 30, specifically, in a hydraulic control unit.

Figure 2:
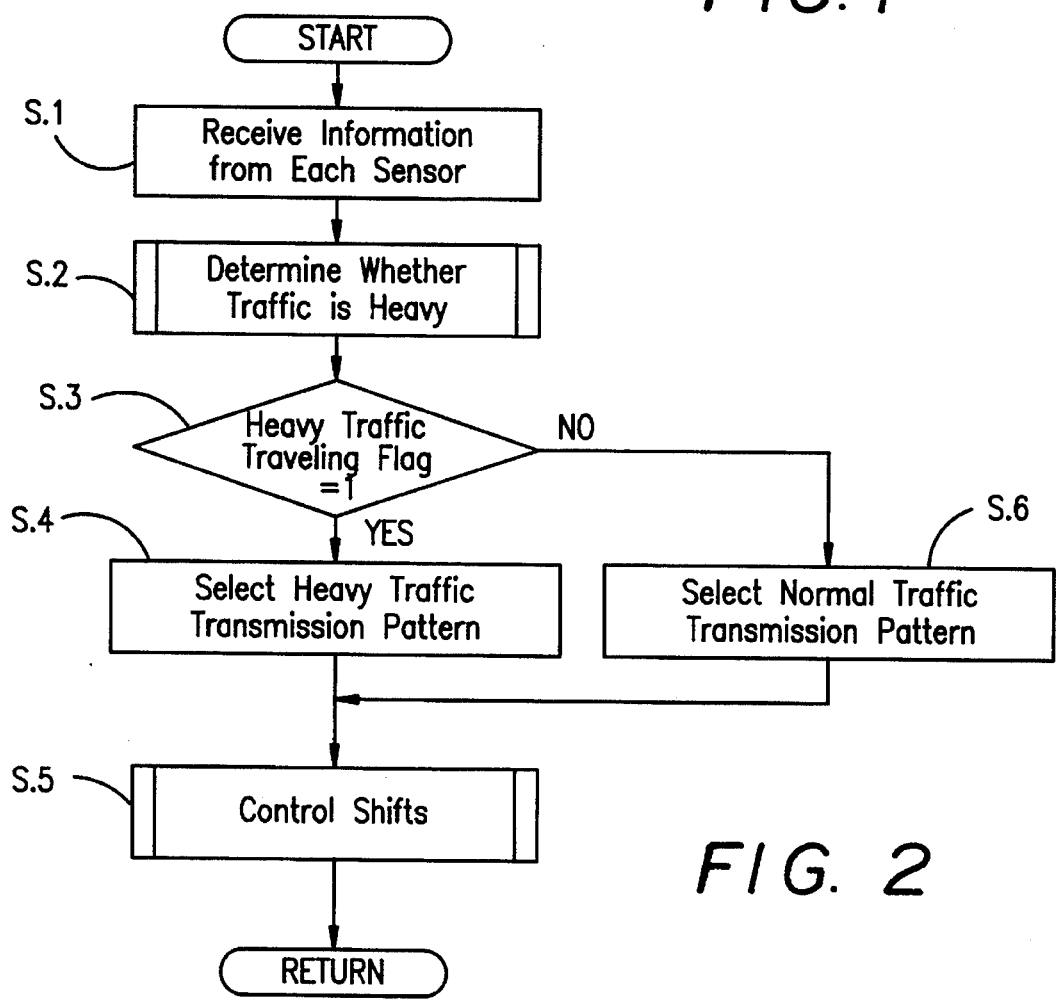
FIG. 2 is a flow chart of a program for use in the control unit shown in FIG. 1.

FIG. 2 is a process flow chart showing the processing routine employed by the transmission control unit 20 which controls the automatic transmission. In step 1, the microprocessor receives the input information from each sensor. In step 2, the traffic condition determinative means 21 determines whether or not traffic is heavy. If the traffic is heavy, a heavy traffic flag is set as will be described later in detail. In step 3, a determination is made as to whether or not the flag is 1. In step 4, if the flag is 1, then the transmission pattern selection means 22 selects a heavy traffic transmission pattern or map. In step 5, the transmission control means 23 controls the automatic transmission 30 in accordance with the heavy traffic transmission map. In step 2, if the traffic is considered to be not heavy, the flag is set to zero as shown in step 3. Then, the transmission pattern selective means 22 selects a normal traffic transmission pattern or map in step 6. In step 5, the transmission control means 23 controls the automatic transmission in accordance with the normal traffic transmission map.

Figure 3:
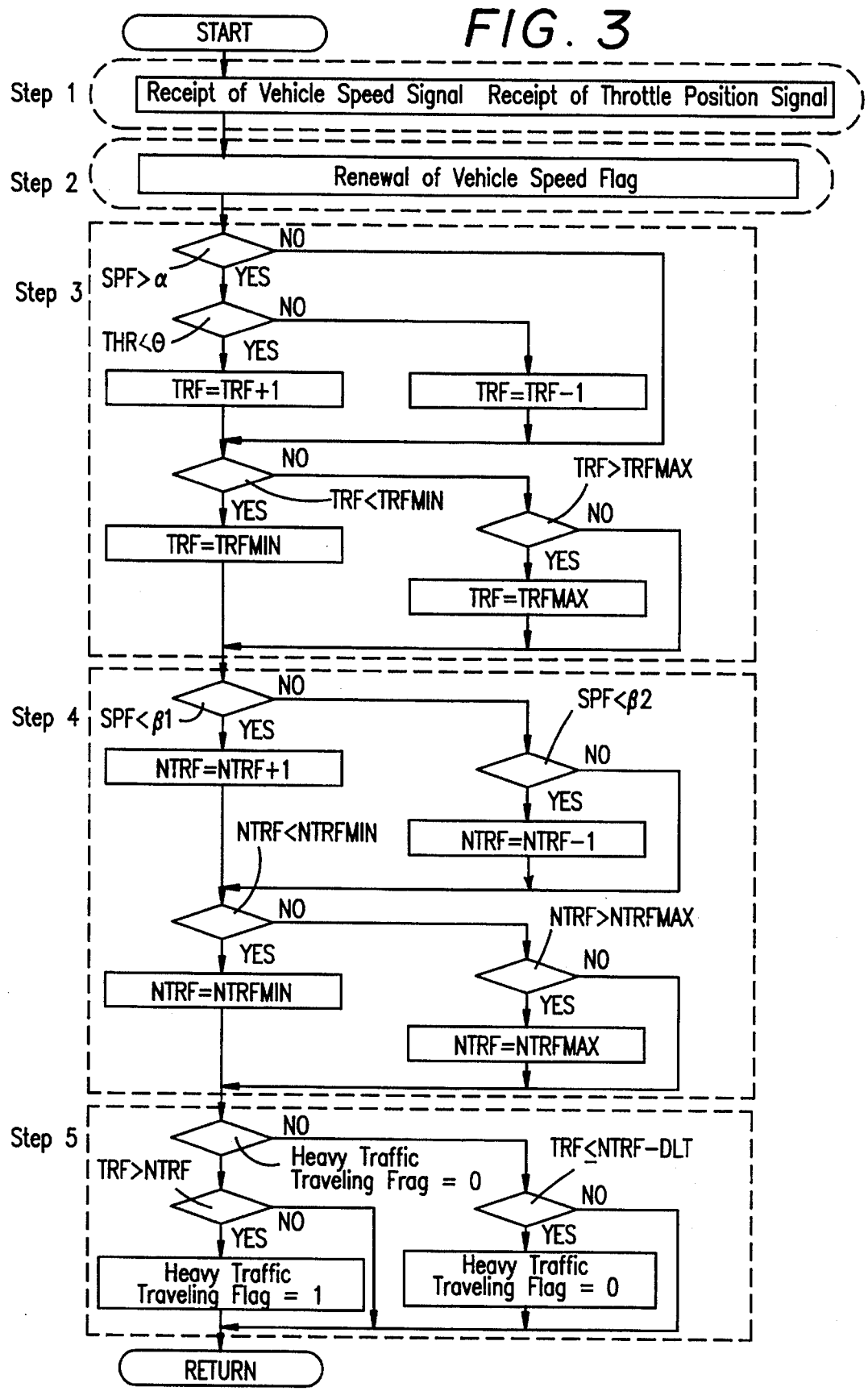
FIG. 3 is a flow chart showing a subroutine determining whether or not traffic is heavy, i.e. step S2 in FIG. 2.

FIG. 3 is a flow chart showing the manner in which the traffic condition determinative means 21 determines whether or not traffic is heavy (step S2 in FIG. 2). In step 1, parameters (in this example, vehicle speed signal (SPD) and throttle position signal (THR)) are used to determine whether or not the traffic is heavy. In step 2, a vehicle speed value or flag (SPF) is reset in response to vehicle speed (SPD). Specifically, the vehicle speed is classified into several vehicle speed zones, as shown for example in Table 1. These vehicle speed zones each extend over a range of 10 km/h. If a vehicle travels less than 20 km/h, the traffic is considered to be considerably heavy. The vehicle speed flag (SPF) is increased or decreased by a predetermined amount, depending on vehicle speed (SPD) as detected. In this case, the boundary vehicle speed between heavy and normal traffic is slightly less than 30 km/h (In this embodiment, the vehicle speed flag for the boundary vehicle speed is +1). The vehicle speed flag is ±4 when a vehicle speed is 10 km/h faster or slower than the boundary vehicle speed. The vehicle speed flag is ±2 when a vehicle speed is 20 km/h faster or slower than the boundary vehicle speed. That is, the difference between the vehicle speed flags and actual vehicle speeds in the intermediate speed zone is significantly greater than the difference between the vehicle speed flags and actual vehicle speeds in the low and high speed zones. This makes it possible to rapidly determine whether of not the traffic is heavy since the vehicle speed flag (SPF) is increased within a short period of time.

TABLE 1

| VEHICLE SPEED (SPD) km/h | SPF |
| --- | --- |
| 0 ≦ SPD <10 | +7 |
| 10 ≦ SPD <20 | +5 |
| 20 ≦ SPD <30 | +1 |
| 30 ≦ SPD <40 | −3 |
| 40 ≦ SPD <50 | −5 |
| 50 ≦ SPD <60 | −6 |
| 60 ≦ SPD | −7 |

Figure 4:
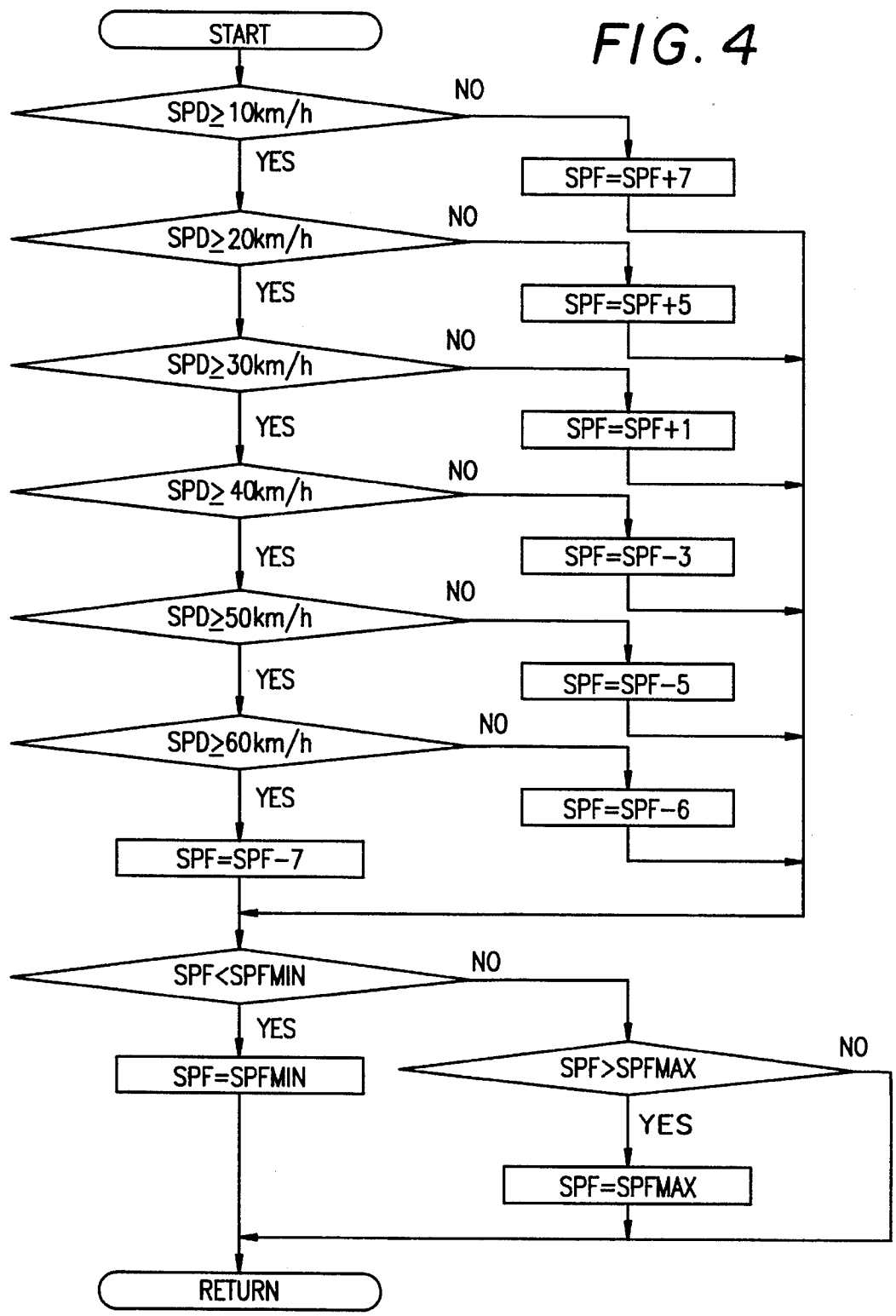
FIG. 4 is a flow chart showing the manner in which a vehicle speed flag is renewed ("step 2" in FIG. 3) and represents a programmed processor, or a portion thereof, constituting the speed flag setting means in a preferred embodiment of this invention.

FIG. 4 is a flow chart showing the manner in which the vehicle speed value or flag (SPF) is reset (step 2 in FIG. 3). This program defines three vehicle speed zones, a low speed zone or a vehicle speed of from 0 to 20 km/h, typical of when traffic is heavy, a high speed zone or a vehicle speed of more than 40 km/h, typical of when the traffic is not heavy, and an intermediate speed zone (boundary between the low speed zone and the high speed zone). In the low speed zone, each predetermined value is positive and, therefore, is added to the vehicle speed flag (SPF). In the high speed zone, each predetermined value is negative and, therefore, its absolute value is subtracted from the vehicle speed flag (SPF). These positive/negative values ("predetermined control values") are determined such that the differences between the vehicle speed flags (SPF) so amended are significantly greater than the differences between actual vehicle speeds. Initially, upon turning on the ignition to start the vehicle, the vehicle speed flag "SPF" is zero. When vehicle speed (SPD) is detected by a vehicle speed sensor 11, it is matched with the appropriate vehicle speed zone in the routine of FIG. 4. The corresponding predetermined control value is then added to or subtracted from the vehicle speed flag (SPD). In this reset process, the vehicle speed flag (SPF) has a minimum value (SPFMIN) of zero and a maximum value (SPFMAX) of 5000. No change is made if the vehicle speed flag (SPF) is below the minimum value (SPFMIN) or above the maximum value (SPFMAX).

Figure 7:
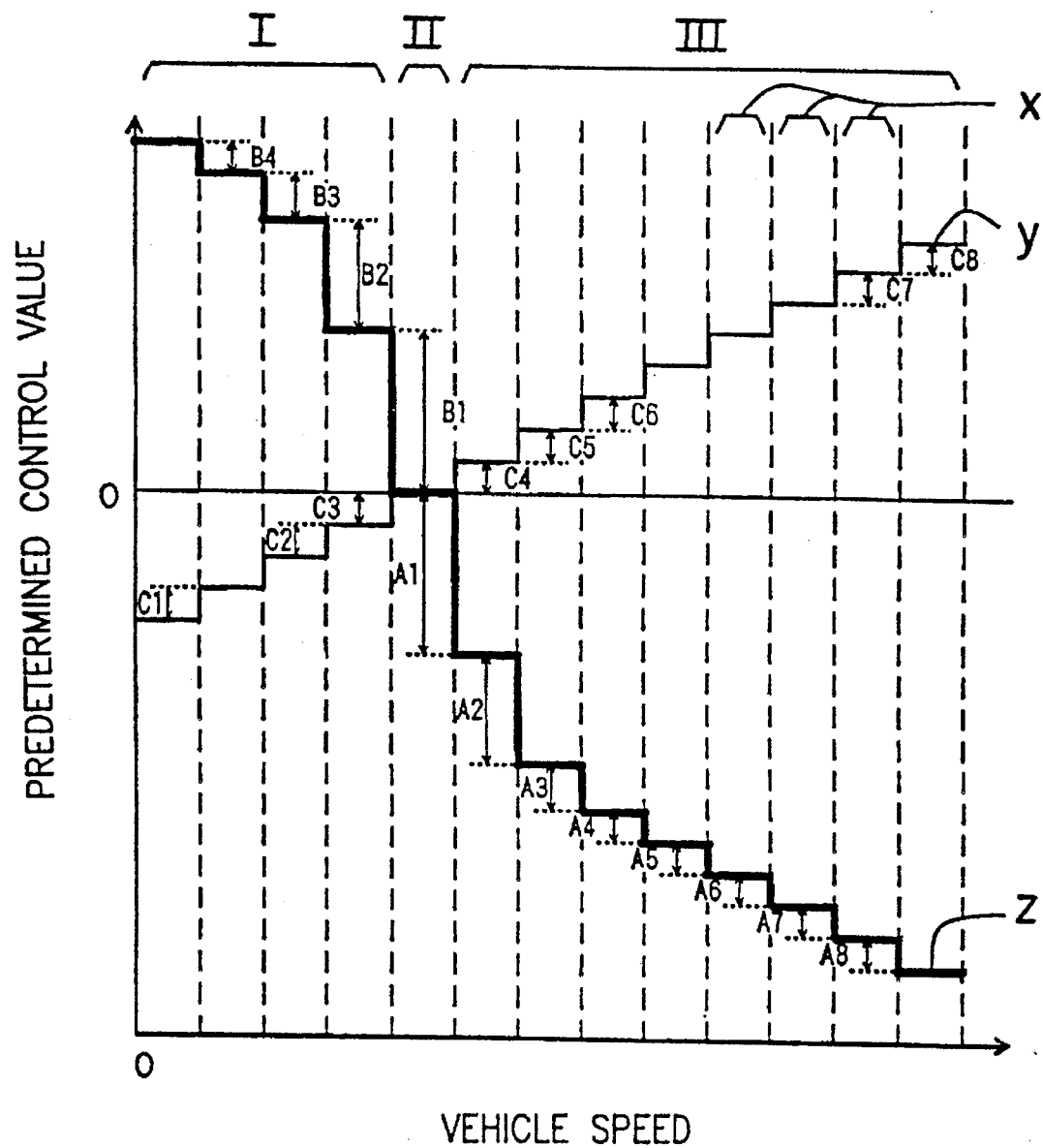
FIG. 7 is a map which represents the speed zone classification means constituting part of the traffic condition determination means in a preferred embodiment of the present invention.

FIG. 7 is a map suitable for use in conjunction with the control routine of FIG. 4. As seen in FIG. 7 a plurality of speed zones "x" each span an identical increment (range) of vehicle speeds. The speed zones "x" are divided into regions for low speed I, intermediate speed (boundary) II and high speed III. The predetermined control values (horizontal bars "z") are negative in region III (high speed zones) and positive in region I (low speed zones). In FIG. 7:

A1, A2, A3 . . . represent the differences between the predetermined control values for adjacent vehicle speed zones in the high vehicle speed region. Note the relationship A1>A2>A3>A4>. . .

B1, B2, B3 . . . represent the differences between the predetermined control values for adjacent vehicle speed zones in the low vehicle speed region, with B1>B2>B3>B4>. . .

C1, C2, C3 . . . are the differences between the (actual vehicle speeds) for adjacent vehicle speed zones, wherein C1=C2=C3=C4=. . . .

As the vehicle speed zones approach the intermediate vehicle speed zone (boundary between the low and high vehicle speed zones), in both the low and high vehicle speed zones, the difference (A1, A2, . . . B1, B2 . . . ) between the predetermined control values for adjacent zones becomes greater. As a result, near the intermediate vehicle speed zone, compared with the differences between the actual values (C1, C2 . . . ), the differences (A1, A2 . . . B1, B2 . . . ) between the predetermined values are accentuated.

Referring again to FIG. 3, in step 3, a heavy traffic flag (TRF) is renewed in response to vehicle speed and throttle position. According to the present invention, when the vehicle speed flag (SPF) is greater than a first predetermined value (α), and the throttle position (THR) is lower than a predetermined value (θ) the traffic is considered to be heavy. This results in an increase in the value of the heavy traffic flag (TRF). On the contrary, when the throttle position (THR) is higher than the predetermined value (θ), the heavy traffic flag (TRF) is decreased. The heavy traffic flag (TRF) has a minimum value (TRFMIN) of zero and a maximum value (TRFMAX) of 200. The next step is to determine whether or not the resulting heavy traffic flag (TRF) is between zero and 200.

In step 4, a non-heavy traffic flag (NTRF) is reset depending on whether traffic is normal or heavy. According to the present invention, when the vehicle speed flag (SPF) is less than a second predetermined value (β1), then the traffic is considered to be normal. This results in an increase in the value of the non-heavy traffic flag (NTRF). When the vehicle speed flag (SPF) is greater than a third predetermined value (β2), then the traffic is considered to be heavy. This results in a decrease in the value of the non-heavy traffic flag (NTRF). The non-heavy traffic flag (NTRF) also has a minimum value (NTRFMIN) of 80 and a maximum value (NTRFMAX) of 180. The next step is to determine whether or not the resulting non-heavy traffic flag (NTRF) is between 80 and 180.

In step 5, the heavy traffic flag (TRF) and the non-heavy traffic flag (NTRF) are used to determine whether or not the traffic is heavy. When the heavy traffic flag (TRF) is greater than the non-heavy traffic flag (NTRF), then the traffic is considered to be heavy. In this case, the heavy traffic traveling flag is 1. On the contrary, when the heavy traffic flag (TRF) is less than the non-heavy traffic flag (NTRF), the heavy traffic flag becomes zero. Hysteresis, (DLT) 30, is provided to prevent hunting. After the heavy traffic traveling flag has been reset, the program is returned to step 1 in order to determine whether or not the traffic is heavy.

Figure 5B:
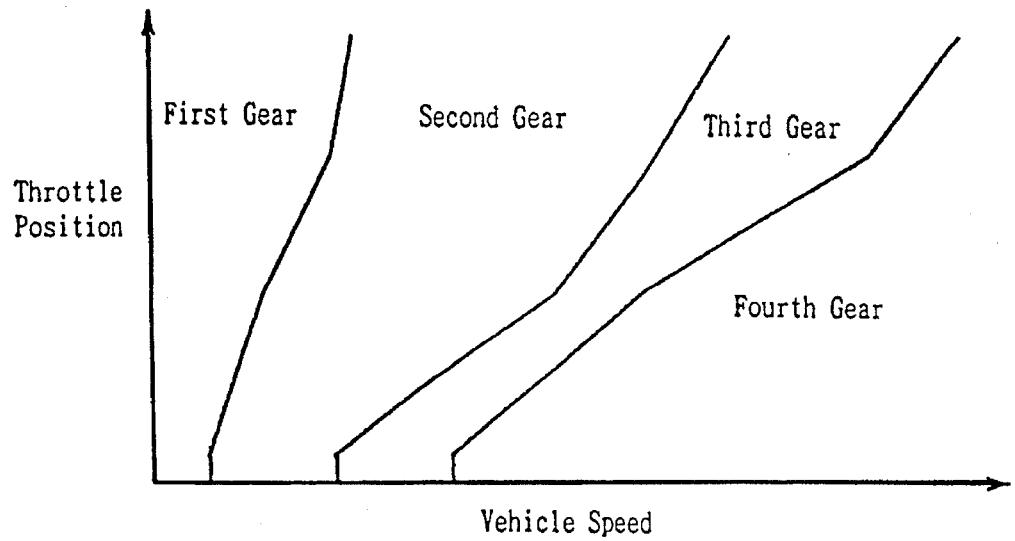
Figure 5B:
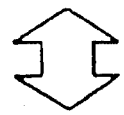
Figure 5B:
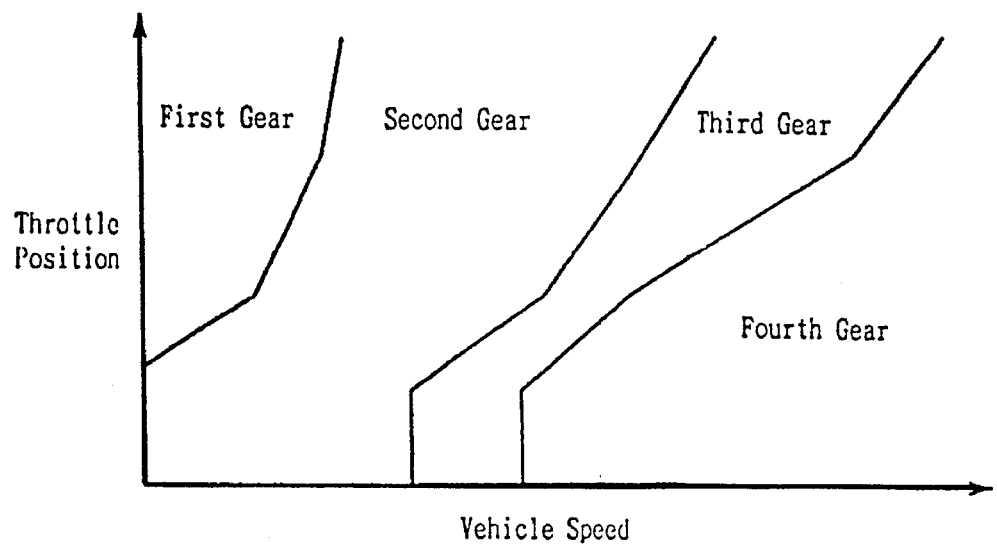

FIG. 5b shows a heavy traffic transmission pattern and FIG. 5a a normal traffic transmission pattern. When the throttle is largely open, like gear ratios are used in both cases as vehicle speed changes. As the throttle is moved toward its closed position, shifting from a first gear to a second gear occurs at a lower speed when the traffic is heavy than when the traffic is normal. Also, the second gear is maintained until a higher speed when the traffic is heavy than when the traffic is normal.

Figure 6A:
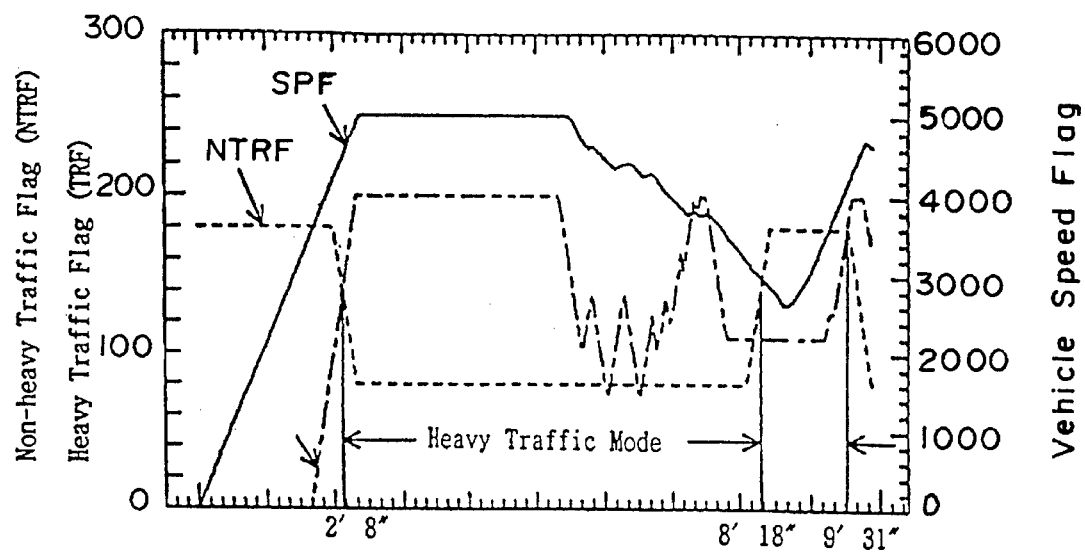
FIG. 6 is a graph showing a change in various flags as the vehicle is running.
Figure 6B:
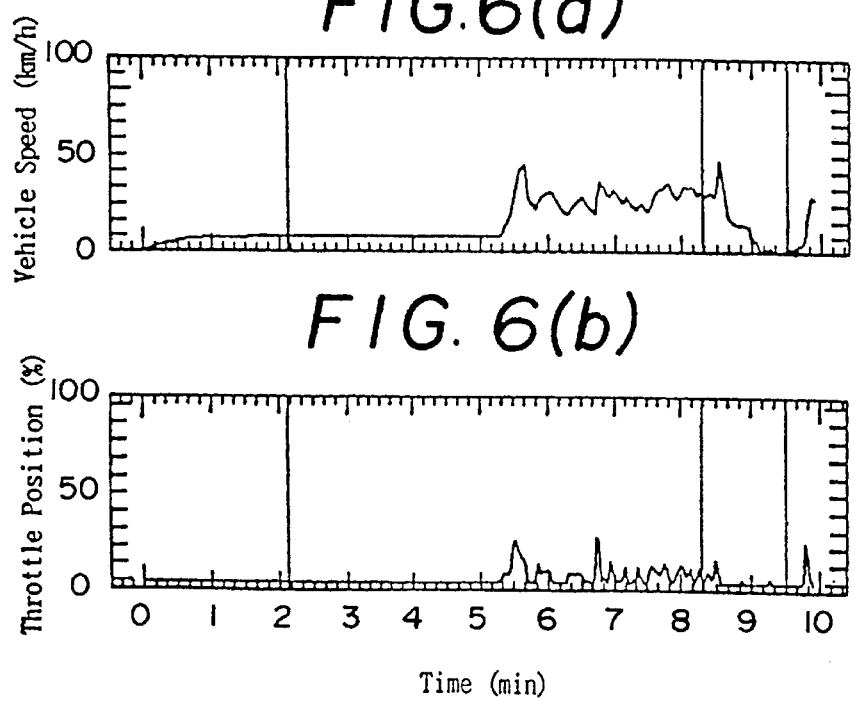
Figure 6C:
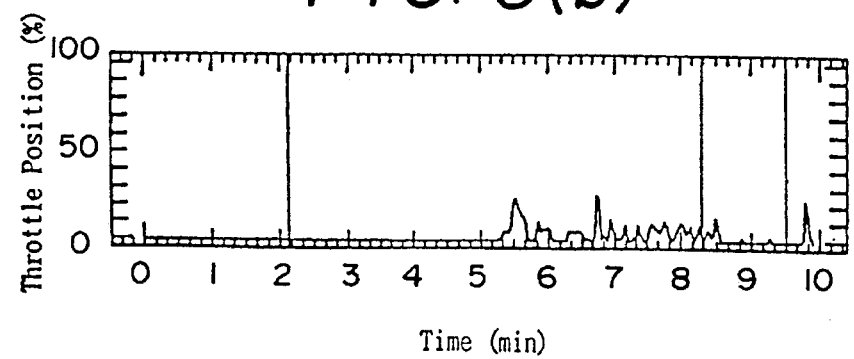

FIG. 6 illustrates the resetting of various flags in accordance with change in throttle position and vehicle speed as the vehicle runs. As shown in FIG. 6, when the vehicle runs at a speed of about 10 km/h, the vehicle speed flag (SPF) increases every time the traffic condition determinative means makes a determination. If the vehicle speed flag (SPF) is greater than the predetermined value ($\alpha$) or 3500, the heavy traffic flag (TRF) begins to increase since the throttle position (THR) is lower than the predetermined value ($\theta$). If the vehicle speed flag (SPF) exceeds the predetermine value ($\beta 2$) or 4200, the non-heavy traffic flag (NTRF) begins to decrease. If the vehicle continues to run at a low speed, and the heavy traffic flag (TRF) becomes greater than the non-heavy traffic flag (NTRF), the traffic is considered to be heavy and the transmission pattern is changed accordingly.

If the vehicle speed increases or the vehicle runs at a speed of about 40 km/h, the vehicle speed flag (SPF) decreases. At this time, the heavy traffic flag (TRF) varies, but generally decreases. If the vehicle speed flag (SPF) becomes less than the predetermined value ($\beta 1$) or 3200, the non-heavy traffic flag (NTRF) begins to increase. If this condition continues, and the heavy traffic flag (TRF) becomes less than the non-heavy traffic flag (NTRF), the traffic is considered to be normal and the transmission pattern is changed accordingly. When the heavy traffic transmission pattern is changed to the normal traffic transmission pattern, the hysteresis is advantageously used to prevent hunting. Thus, the actual change in the transmission pattern is subject to slight delay, as shown.

In summary, the control unit is designed to increase or decrease the vehicle speed flag (SPF) by a predetermined amount. As such, the transmission map will not be changed if vehicle speed is temporarily outside the heavy traffic range. A predetermined value is a positive or additional value when the vehicle speed is within the low speed zone and a negative or subtractive value when the vehicle speed is within the high speed zone. The difference between vehicle speed values and actual vehicle speeds in the intermediate speed zone is significantly greater than the difference between vehicle speed values and actual vehicle speeds in the low and high speed zones. In this way, when a vehicle runs within the low speed zone or in heavy traffic, the vehicle speed flag (SPF) is increased more than the difference between actual vehicle speeds. That is, the vehicle speed flag (SPF) is subject to rapid change. This allows for more rapid and accurate determination of traffic conditions than the use of average vehicle speed. A combination of the vehicle speed flag (SPF) and the throttle position (THR) also insures appropriate determination of traffic conditions. In addition, the non-heavy traffic determinative means is operable to obtain a non-heavy traffic value from the non-heavy traffic flag (NTRF). The non-heavy traffic value indicates that a vehicle is running at a high speed relative to the speeds defining heavy traffic values. This non-heavy traffic value is compared with a heavy traffic value to allow for more accurate determination since the determination is not made based only on one of the two values. Where the heavy traffic determinative means and the non-heavy traffic determinative means are likely to make an inaccurate determination, no change will be made to either value. Thus, each value will meet with its own object for more accurate determination.

While a preferred embodiment of the present invention has been described in detail, the invention is not limited thereto. Various modifications may be made within the scope of the invention as defined in the appended claims. Particularly, additional/subtractive values which may vary depending on vehicle speeds, vehicle speed ranges, and transmission pattern or map may of course be changed depending on vehicle types, gear trains in an automatic transmission, driver's attitude or road conditions.

What is claimed is:

1. A transmission control unit for an automatic transmission for controlling the automatic transmission in accordance with one of a heavy traffic control scheme and a light traffic control scheme, said control unit comprising:

sensor means for detecting parameters representative of vehicle conditions including at least vehicle and throttle opening, traffic condition determination means for classifying traffic as heavy or light, based on the parameters as detected by said sensor means, said traffic condition determination means including:

speed zone classification means for defining a plurality of vehicle speed zones, each of said zones extending over a range of vehicle speed values spanning a predetermined speed differential, said speed zones including a plurality of low speed zones, a plurality of high speed zones and a boundary dividing said low speed zones from said high speed zones, said speed zone classification means providing a predetermined control value for each of said plurality of vehicle speed zones, said predetermined control values being such that the difference between said predetermined control values for adjacent zones increases with increasing proximity to said boundary, said predetermined control values being positive for said low speed zones and negative for said high speed zones, speed flag setting means for setting a vehicle speed value and for matching said vehicle speed detected by said sensor means to the one of said vehicle speed zones containing the detected speed, the predetermined control value for said one vehicle speed zone being added to said vehicle speed value to reset the vehicle speed value, the traffic being classified as heavy if said reset vehicle speed value exceeds a preset value and being classified as light if said reset vehicle speed value is less than said preset value, and transmission pattern selective means for selecting one of a normal traffic transmission map and a heavy traffic transmission map in response to traffic classification determined by said traffic condition determination means, and transmission control means for changing gear ratios according to the selected transmission map.

2. The control unit of claim 1 wherein said boundary is an intermediate speed zone spanning a range of speeds equal to said predetermined speed differential.

3. The control unit of claim 1 wherein the traffic is classified as heavy if said reset vehicle speed value is positive and as light if said reset vehicle speed value is negative.

4. The control unit of claim 1 wherein vehicle speed is detected by said sensor means and said speed flag setting means resets said vehicle speed value in accordance with the detected vehicle speed, repeatedly, at intervals of a preset time period.

5. The control unit of claim 1, wherein said traffic condition determination means includes a heavy traffic determination means for increasing a heavy traffic value indicative of heavy traffic when said vehicle speed value is greater than a first predetermined speed value, and the throttle position detected by said sensor means is lower than a predetermined throttle value, and for decreasing said heavy traffic value when said vehicle speed value is greater than said first predetermined speed value, and the throttle position is higher than said predetermined throttle value, wherein said heavy traffic value obtained by said heavy traffic determination means is used as said reset vehicle speed value to determine whether or not the traffic is heavy.

6. The control unit of claim 5, wherein said traffic condition determination means further includes a non-heavy traffic determination means increasing a non-heavy traffic value when said vehicle speed value is less than a second predetermined speed value, said second predetermined speed value being less than said first predetermined speed value, and for decreasing said non-heavy traffic value when said vehicle speed value is greater than a third predetermined speed value, said third predetermined speed value being greater than said second predetermined speed value, whereby the traffic is considered to be heavy when said heavy traffic value is greater than said non-heavy traffic value.

7. The unit of claim 6, wherein said heavy traffic determination means does not change said heavy traffic value when said vehicle speed value is less than said first predetermined speed value, and said non-heavy traffic determination means does not change said non-heavy traffic value when said vehicle speed value is greater than said second predetermined speed value and less than said third predetermined speed value.

8. The unit of claim 1, wherein said speed zone classification means defines maximum and minimum vehicle speed values.

9. The unit of claim 5, wherein said heavy traffic determination means defines maximum and minimum heavy traffic values.

10. The unit of claim 6, wherein said non-heavy traffic determination means defines maximum and minimum non-heavy traffic values.

* * * * *

UNITED STATES PATENT AND TRADEMARK OFFICE
CERTIFICATE OF CORRECTION

PATENT NO. : 5,558,600
DATED : September 24, 1996
INVENTOR(S) : TSUKAMOTO et al

It is certified that error appears in the above-indentified patent and that said Letters Patent is hereby corrected as shown below:

<u>ON THE TITLE OF THE PATENT</u>:

"[54] HEAVY/LIGHT TRAFFIC BASED ON VEHICLE SPEEDS AND THROTTLE POSITIONS" should read --[54] TRANSMISSION CONTROL UNIT FOR DETERMINING HEAVY/LIGHT TRAFFIC BASED ON VEHICLE SPEEDS AND THROTTLE POSITIONS--.

Col. 6, line 63, "5bshows" should read --5b shows--; and
line 64, "5aa" should read --5a a--.

Signed and Sealed this

Twenty-second Day of July, 1997

Attest:

BRUCE LEHMAN

*Attesting Officer*  *Commissioner of Patents and Trademarks*